INVENTOR
ERICH TLAKER
BY Cushman, Darby & Cushman
ATTORNEYS

3,566,651
Patented Mar. 2, 1971

3,566,651
METHOD AND APPARATUS FOR FORMING INTERNALLY PROFILED TUBULAR PARTS BY MATERIAL DISPLACEMENT
Erich Tlaker, Springfield, Vt., assignor to Fellows Gear Shaper Company, Springfield, Vt.
Filed Oct. 3, 1968, Ser. No. 764,896
Int. Cl. B21c *37/20*
U.S. Cl. 72—76                                7 Claims

ABSTRACT OF THE DISCLOSURE

A method and device for forming tubular parts by material displacement wherein a hollow workpiece blank is fed past a tapered mandrel positioned within the blank and intermediate the deforming areas of dies. The mandrel is tapered from its trailing to its leading end and the mandrel's largest cross sectional dimensions are greater than the internal cross sectional dimensions of the workpiece blank whereby the deformation of the workpiece blank about the mandrel by the dies gradually reduces the exterior dimensions and gradually increases the interior dimensions of the workpiece blank until the internal cross sectional dimensions of the workpiece blank conform to the exterior cross sectional dimensions of the mandrel at the trailing end of the mandrel.

BRIEF DESCRIPTION OF THE INVENTION

Figure 1:
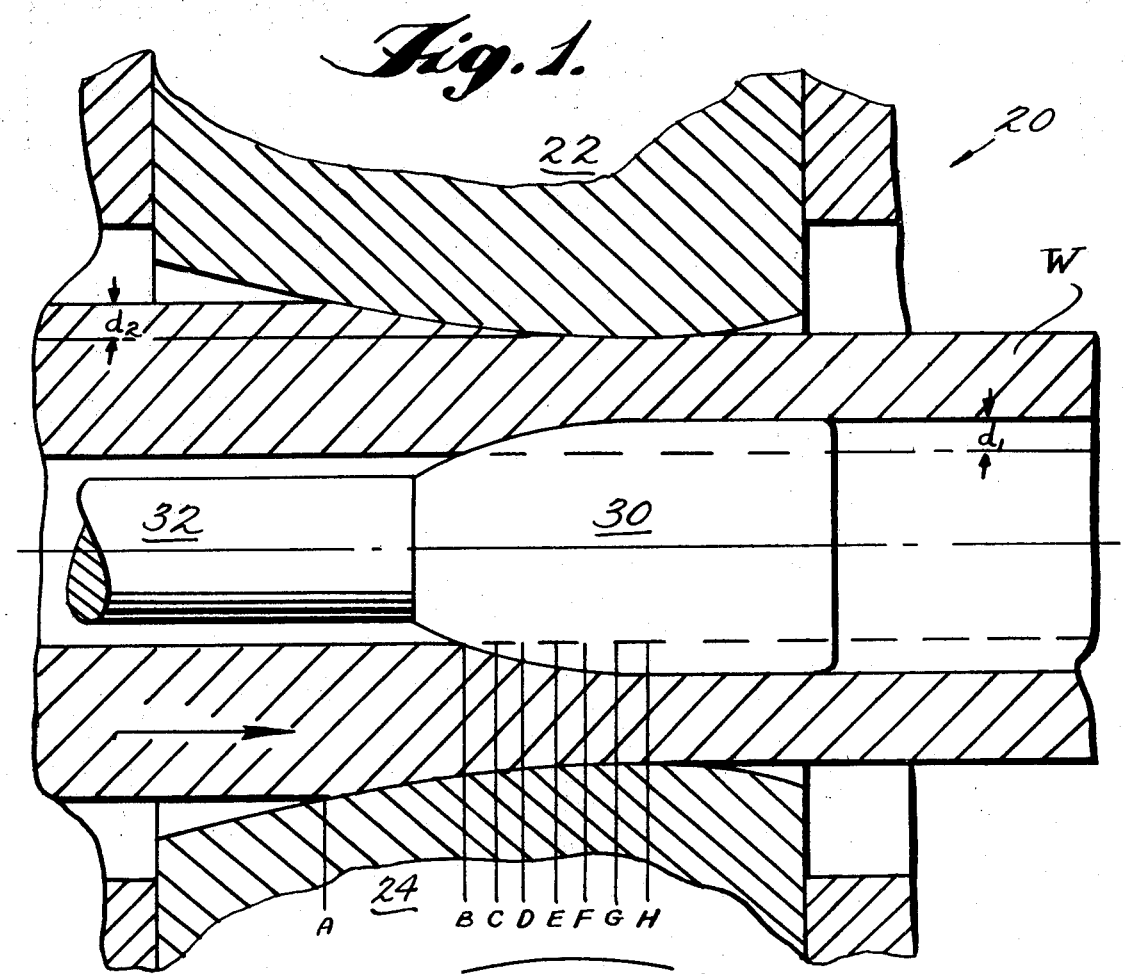

The present invention relates to a method and apparatus for producing tubular parts by material displacement rather than material removal and to a novel radial reverse flow method and apparatus for forming tubular parts with specific internal configurations that are the counterpart or the complement of the mandrel. The present development is particularly suited for accurately forming internally toothed parts such as internal helical gears and splined parts where the splines are deep and narrow but is in no way restricted to internally toothed parts. The method and apparatus can be used for forming all types of tubular parts where specific internal cross sectional dimensions are desired.

In conventional radial forming operations such as those performed on rotary swaging or similar types of equipment, a hollow part is produced by reducing both the outside and inside dimensions of a hollow workpiece blank to make the interior of the blank conform to a mandrel of smaller cross sectional dimensions which is placed inside the hollow workpiece blank. According to this conventional forming method, a tubular workpiece blank, with larger outside and inside dimensions than that of the mandrel used in the forming operation or the part being produced, is fed into a set of reciprocating dies which exert intermittent pressures on the outer circumference of the workpiece of sufficient magnitude to cause permanent deformation of the workpiece blank. The workpiece material is displaced radially inward by the dies until its inner surface of the material makes contact with the mandrel which is placed inside the tubular workpiece blank, in proper axial alignment with the dies.

If the mandrel is a cylinder, once the workpiece material contacts the mandrel further radial motion of the material is arrested and subsequent outside diameter reduction of cross sectional area that results entirely in the elongation of the part. If the mandrel is profiled, radial material flow is inhibited only in the area of initial contact between the workpiece and the mandrel. Therefore, additional outside diameter reduction of the workpiece blank will gradually cause the workpiece material to flow radially inward into the profile spacing between the areas of first contact. If the reduction requirements are not too great, the progressive outside diameter reduction results in complete filling of the mandrel spaces and the interior of the workpiece becomes the complement of the mandrel profile.

However, it has been found that it becomes increasingly difficult to produce material flow into profile spaces in the above manner as the depth of the spaces increases, their width decreases or the workpiece material strength increases. Furthermore, it has proven impossible to produce heavy wall parts with internal tooth profiles in this manner or thin wall parts with deep and narrow internal profiles. Likewise, it has not been possible to produce accurate internal helical gears in this matter.

In the conventional radial forming method, the required outside reduction increases for each increment of metal flow radially inward into the profile spaces. With an increasing total depth of metal flow, the ratio of outside reduction to inside reduction into profiles increases and whereas the ratio may be one to one at the beginning of metal flow into the spaces and it can increase to as much as twenty to one before the mandrel spaces are filled. This, of course, requires a large amount of outside reduction cross sectional area reduction in forming tubular parts with internal teeth of great depth or narrow width and results in very high forming forces or machine loads and high stresses on the forming tools. The increased forces and stresses are caused in part by the increase in strength of the material as it continues to be cold worked and the greater contact length between the dies and the material necessitated by the increased outside reduction required to cause the flow of the material into the profile spaces.

In fact, the reduction requirement in many cases are so high that the deformation limits of the workpiece material are reached causing material fracture before the profile is completely formed.

The radial reverse flow method and apparatus of the present invention for forming tubular parts eliminates the aforementioned difficulties and limitations of the conventional forming operation. The present development provides for the forming of part-profiles hitherto considered impossible and is capable of producing with ease deep internal profiles with only fractions of the previously required forming forces thereby substantially reducing stresses on the forming tools. The reverse flow method and apparatus also lessens the amount of die contact area between the die and the material of the workpiece blank without fracturing the blank material thereby reducing tool stresses and machine loads experience in the methods hitherto employed.

Therefore, an object of the invention is to enable the formation of a part from a workpiece blank which, after material displacement through a reduction of the exterior dimensions of the workpiece blank and an increase or expanding of the interior dimensions of the workpiece blank conforms accurately to the shape of the mandrel.

A further object of the present development is to provide a method and apparatus for forming deep and complicated internal profiles on tubular parts by material displacement and for producing parts by material displacement which have been, heretofore, considered impossible to manufacture.

Another object of the invention is to provide a method and apparatus for producing tubular parts by material displacement at substantially reduced pressures and at substantially lower total external and internal reductions of the workpiece blank than previously possible, thereby preventing material fracture of the workpiece before the required profile is formed and lessening the forming forces or machine loads in high stresses on the forming table.

Briefly the present invention comprises a tapered mandrel of gradually increasing external dimensions from its leading end to its trailing end that has an exterior configuration or profile complemental to the internal profile to be imparted to the workpiece blank. The mandrel is axially aligned within a tubular workpiece blank and also aligned between opposed forming dies or other forming means. In the method of the present invention a metallic tubular workpiece blank which initially has smaller internal cross sectional dimensions than the greatest cross sectional dimensions of the mandrel is fed over the mandrel between reciprocating dies or equivalent deforming means which exert intermittent forces on the outer surface of the workpiece of sufficient magnitude to result in permanent deformation of the workpiece material. As the workpiece blank is intermittently fed over the mandrel and between the deforming dies there is a gradual and progressive reduction of the exterior dimensions of the workpiece and a gradual and progressive increase in the internal dimensions of the workpiece with the material flow of the workpiece resulting in the interior of the workpiece blank being formed into the profile of the mandrel.

Figure 2:
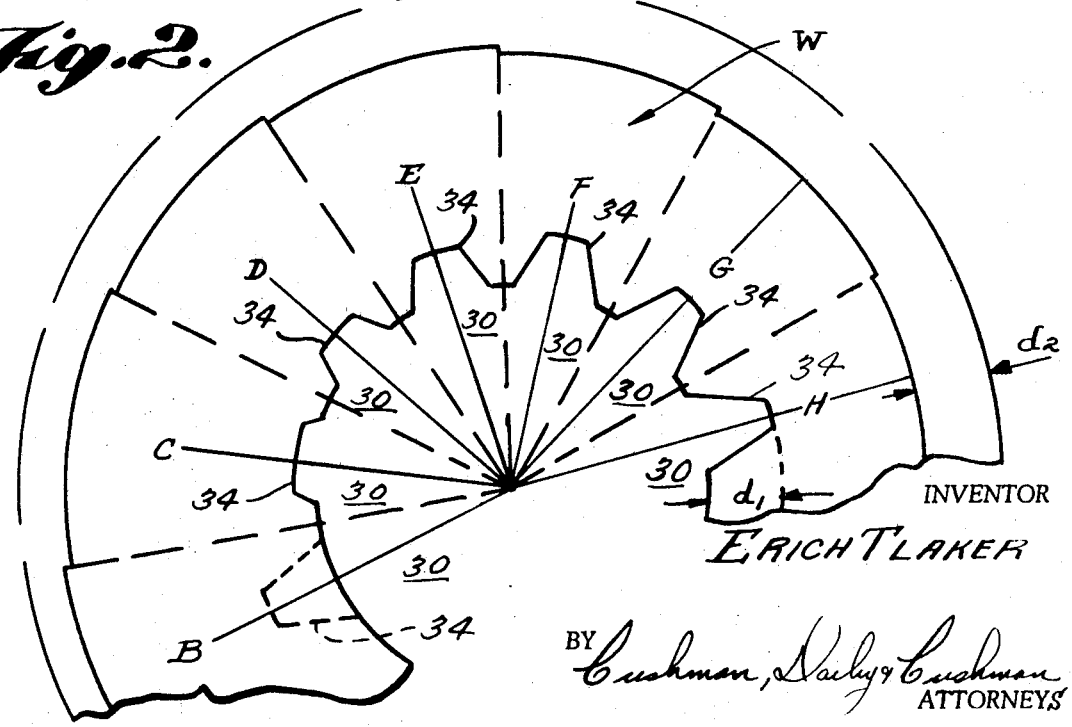
Figure 3:
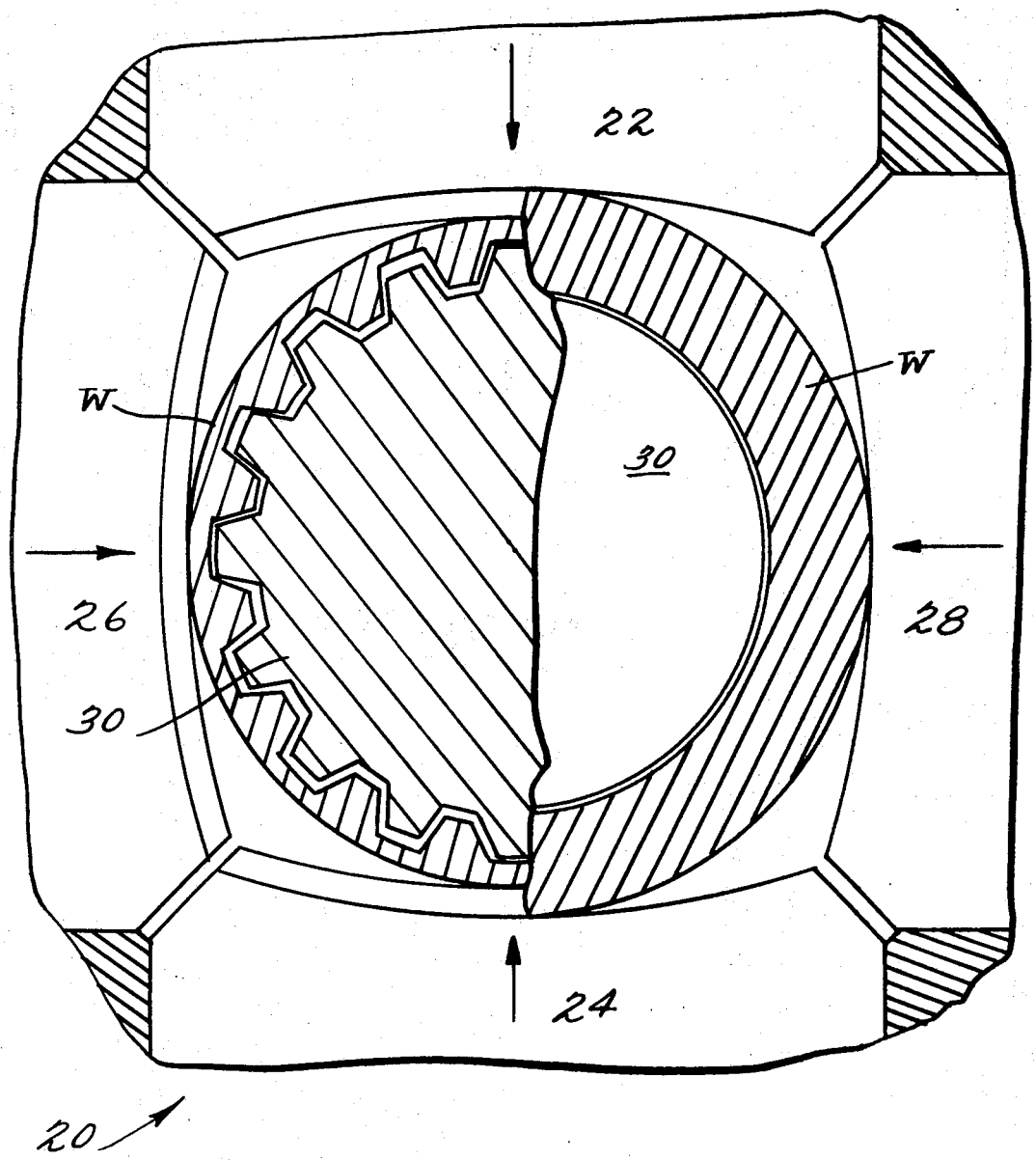

The above objects and advantages will become more apparent and other objects and advantages of the present invention will become apparent from the following detailed description when taken in conjunction with the accompanying drawings in which:

FIG. 1 is a longitudinal cross sectional view taken through a die and mandrel assembly of the present invention with a workpiece blank within the assembly;

FIG. 2 is a composite of transverse fragmentary sectional views of the workpiece blank and mandrel taken substantially along section lines B to H of FIG. 1 to illustrate the gradual formation of internal teeth by the method and apparatus of the present invention; and FIG. 3 is composite of transverse fragmentary sectional views of the dies, mandrel and workpiece blank taken substantially along lines B and H of FIG. 1 to illustrate the cooperation between the dies, mandrel and workpiece blank when the workpiece is undergoing deformation.

DETAILED DESCRIPTION OF THE INVENTION

Referring now to the figures, one form of apparatus 20 for carrying out the method of the present invention is shown. The apparatus comprises two pairs of opposed reciprocating dies 22, 24 and 26, 28 which are intermittently pressed inwardly and into engagement with the exterior surface of the workpiece to effect metal or material flow by mechanisms well known in the art such as rotary swaging machines or any similar eccentric or cam-operated mechanisms used for radial forming operations. Between the intermittent strokes of the dies the workpiece blank W is fed axially between the dies by a conventional feed mechanism (not shown) which can rotate or permit the rotation of the mandrel and workpiece blank relative to the dies so as to bring a different localized circumferential areas of the workpiece blank into position to be acted on by the dies for the radial forming. In this way the entire circumference of the workpiece is worked prior to the each intermittent feed of the workpiece between the dies. In some forming operations, the rotation of the mandrel and workpiece blank can be omitted and the dies 22, 24, 26, 28 can be rotated instead.

The mandrel 30 of the present invention is supported and positioned by a mandrel rod 32 which can be fixed or rotated. The rod 32 locates the mandrel intermediate the opposed dies 22, 24 and 26, 28 whereby the mandrel cooperates with the dies to radially deform a workpiece blank. The mandrel 30 has a reverse taper, being tapered from its trailing end to the leading end which is secured to the mandrel rod 32. The tapered profile of mandrel 30, and die entrance angles and the dimentral die profiles along the pressure of deformation are coordinated to cause flow of the plastic workpiece material and permit a limited elastic recovery of the deformed workpiece blank after each deforming stroke of the dies. The particular angles and profiles of the dies and mandrel will vary according to the material of the workpiece blank, the cross sectional dimensions of the workpiece and the reduction of the workpiece blank desired. The elastic recovery of the material after each deforming stroke is such that the recovered inside dimension of the deformed material will be slightly larger than the particular section of the mandrel upon which it has been formed. This, of course, permits the intermittent feed to position the workpiece blank further along the mandrel 30 prior to the next deforming stroke.

The exterior surface of mandrel 30 can be smooth and round in transverse cross section when it is desired to produce tubing with a substantially round inside diameter or it can have various other cross sectional configurations or profiles depending on the profile desired for the interior of the workpiece blank. In addition as best shown in FIGS. 2 and 3 of the drawings the mandrel 30 can be provided with straight, spiral helical teeth or other profiles which are tapered in the direction of the longitudinal axis of the mandrel from the trailing to the leading end with the exact profile selected for the mandrel depending on the internal configuration or profile desired for the workpiece blank. Due to the reverse taper of the mandrel as the workpiece blank is fed over the mandrel the material of the workpiece blank is gradually worked by the teeth 34 so that the outward radial flow of the material in the workpiece shapes the workpiece into a profile complemental to that of the mandrel. In this way the material of the workpiece blank which ends up in the bottom of the profile spaces between adjacent teeth is there at the beginning of forming and does not have to flow into the spaces thereby greatly reducing the amount of deformation required to form the finished product.

FIG. 1 shows a hollow workpiece blank W in the process of being formed by the reversed flow method of the present invention. Opposing forming dies 22, 24 and 26, 28 are reciprocated radially relative to the workpiece blank and exert high intermittent pressures on the outer circumference of the workpiece which exceed the yield strength of the material to cause a flow of the plastic material which is followed by limited elastic recovery after the pressure is relaxed. The mandrel 30 which is supported on rod 32 is positioned in between the dies and as can be clearly seen the cross sectional dimensions of the mandrel 30 at its leading end 36 are smaller than the internal cross sectional dimensions of the workpiece blank while the cross sectional dimensions of the mandrel are greater than the internal dimensions of the workpiece blank at the trailing end 38 of the mandrel.

As mentioned above, the tubular workpiece blank W is advanced by a conventional feed arrangement (not shown) into contact with the dies at point A. At this point the dies begin to reduce the outside dimensions of the workpiece blank W which causes a proportionate reduction of the inside dimensions of the workpiece blank.

As the workpiece W is fed between the dies in an out of phase relation to the pressure applying cycles of the dies, the entire circumference of a limited workpiece area being worked during each cycle, the total outside reduction and the corresponding total inside reduction increases to stepwise progression until the inside reduction is sufficient to cause the inside of the workpiece to make contact with the mandrel at point B. At this point the cross sectional dimensions or profile of the mandrel 30 are substantially smaller than the dimensions or profile of the mandrel at the trailing edge. If the mandrel is forming internal teeth on the workpiece, the forming teeth 34 of the mandrel start at point B and gradually increase in their radial depth (see sections B to H, FIG. 2) as the trailing end of the mandrel is approached. This results in a gradual radial increase of the internal workpiece dimensions through outward material flow by a distance $d_1$, until the workpiece conforms to the profile of mandrel while the external radial dimensions are gradually decreased through material flow by $d_2$.

Dies 22, 24 and 26, 28 apply pressures of sufficient magnitude to exceed the yield strength of the workpiece in localized areas around the circumference and this causes the incremental flow of the workpiece material to shape the workpiece in the complemental profile of the mandrel profile. While FIG. 3 shows pressure being applied only at four points around the circumference of the workpiece the relative rotation of the workpiece and dies assures that the entire circumference of the workpiece is worked.

As shown in FIG. 3, wherein the amount of recovery is exaggerated for purposes of illustration an elastic recovery of the deformed workpiece blank takes place after each deforming stroke when the pressure on the workpiece is relaxed. The elastic recovery of the deformed workpieces is such that the recovered inside dimension of the deformed material is slightly larger than the particular section of the mandrel upon which it has been formed. The very small amount of clearance produced between the mandrel and the elastically recovered workpiece makes it now possible to advance the workpiece a small amount further over the expanding profile of the mandrel.

The forming of the internal profile on the workpiece continues in the above outlined manner until at section G the desired amount of outside reduction and inside extension has been performed and the workpiece has been given a desired internal cross-section, configuration, or profile. Usually it is preferred to shape the expanding mandrels in such a manner that the maximum dimensions of the mandrel profile are reached at a section H a short distance beyond section G. This slight increase of radial mandrel dimensions between G and H causes a reduction of the clearance between the workpiece and mandrel, there being a permanent limited elastic recovery after the material flow at H since no further outside reduction of material displacement takes place, which is necessary for accurately guiding the workpiece. This need for an accurate workguide is especially necessary in the case of forming internal helical profiles.

While the preferred form of the invention has been shown and described, it is to be understood that all suitable modifications and equivalents can be resorted to which fall within the scope of the invention.

What is claimed is:

1. In a method of forming internally profiled workpieces by displacing material by flow, the steps of feeding a work blank having a given exterior dimension over a reversed taper mandrel having exterior dimensions at its largest cross section greater than the starting interior dimensions of said blank and having a profile thereon which is the complement of the desired profiled shape to be formed on the work, applying forces to said work blank in limited localized areas of the circumference to cause material flow so as to reduce said exterior dimension of said blank, relatively feeding said work blank axially over said mandrel in timed relation to the application of said forces so as to increase said starting interior dimensions of said blank, and rotating the position of application of said forces relatively to the axis of said work blank so that said forces are incrementally displaced about the circumference of said work blank.

2. In a method as defined in claim 1 said mandrel having profile teeth thereon which are gradually tapered from the trailing end of said mandrel to the leading end of said mandrel.

3. A method of forming internally profiled tubular workpieces by displacing material by flow comprising:
intermittently feeding a tubular workpiece blank over a reversed taper mandrel having a profile thereon which is the complement of the desired profiled shape to be formed on the workpiece blank, said mandrel having exterior dimensions at its largest cross section greater than the starting interior dimensions of said workpiece blank; and
forming said workpiece blank about said mandrel by reducing the exterior dimensions and increasing the interior dimensions of said workpiece blank until material flow of said workpiece blank forms the internal surface of said workpiece blank into a profile which is the complement of said mandrel profile.

4. A method of forming tubular parts comprising:
positioning a reversed taper mandrel within a hollow workpiece blank, said reversed taper mandrel having a profile thereon which is the complement of the desired profiled shape to be formed on the workpiece blank, said mandrel having exterior dimensions at its largest cross section greater than the starting interior dimensions of said workpiece blank;
intermittently applying radially inwardly directed pressure to an exterior surface of said workpiece blank to cause material flow of said workpiece blank wherein said interior profile of said workpiece blank conforms to the exterior profile of said mandrel; and
intermittently feeding said workpiece blank over said mandrel, said feeding of said workpiece blank being out of phase with said application of pressure whereby the expansion of the internal profile of said workpiece blank due to limited elastic recovery of said workpiece blank after the application of pressure has ceased allows said workpiece blank to be axially advanced until contact with the tapered exterior profile of said mandrel is made.

5. In a method as defined in claim 4 said mandrel having profile teeth thereon which are gradually tapered from the trailing end of said mandrel to the leading end of said mandrel.

6. An apparatus for forming tubular parts comprising:
reversed taper mandrel means having a tapered profile from a trailing to a leading end;
deforming means aligned with said reversed taper mandrel means; and
feeding means for intermittently feeding a hollow workpiece blank, of smaller internal dimensions than the largest external dimensions of said reversed taper mandrel, over said reversed taper mandrel wherein said deforming means in cooperation with said reversed taper mandrel means causes material flow of said workpiece blank until the internal profile of said workpiece blank conforms to said external profile of said reversed taper mandrel.

7. A method as in claim 4 including the step of rotating the position of applications of said pressure relatively to the axis of said work blank so that said pressures are incrementally displaced about the circumference of said work blank.

References Cited

UNITED STATES PATENTS

| 988,569 | 4/1911 | Harkness | 72—209 |
| 1,837,161 | 12/1931 | Herz | 72—209 |
| 3,422,518 | 1/1969 | French | 72—370 |

FOREIGN PATENTS

| 1,073,209 | 9/1954 | France. | |

LOWELL A. LARSON, Primary Examiner

U.S. Cl. X.R.

72—370, 402